(12) United States Patent
Haarer et al.

(10) Patent No.: US 8,968,662 B2
(45) Date of Patent: Mar. 3, 2015

(54) TIME TEMPERATURE INDICATOR

(75) Inventors: Dietrich Haarer, Bayreuth (DE); Tal Gueta-Neyroud, Eshhar (IL); Husein Salman, Golan Heights (IL)

(73) Assignee: Freshpoint Quality Assurance Ltd., Nesher, Haifa (IL)

( * ) Notice: Subject to any disclaimer, the term of this patent is extended or adjusted under 35 U.S.C. 154(b) by 1012 days.

(21) Appl. No.: 13/001,049

(22) PCT Filed: Jun. 15, 2009

(86) PCT No.: PCT/EP2009/057334
§ 371 (c)(1),
(2), (4) Date: Mar. 18, 2011

(87) PCT Pub. No.: WO2009/156285
PCT Pub. Date: Dec. 30, 2009

(65) Prior Publication Data
US 2011/0155043 A1  Jun. 30, 2011

(30) Foreign Application Priority Data

Jun. 23, 2008  (EP) ..................................... 08158759

(51) Int. Cl.
G01D 21/00 (2006.01)
G01K 3/04 (2006.01)

(52) U.S. Cl.
CPC ....................................... *G01K 3/04* (2013.01)
USPC ........................................ 422/82.01; 374/102

(58) Field of Classification Search
CPC ......... G01K 3/04; G01N 21/75; G01N 31/00; C23C 16/52; G01D 21/00; B32B 37/00
USPC ................. 116/201, 206, 207, 216–220, 200; 156/273.3, 280; 422/420, 82.01; 436/2, 436/7; 374/100, 102–107
See application file for complete search history.

(56) References Cited

U.S. PATENT DOCUMENTS

| 3,591,810 A | 7/1971 | Jackson |
| 4,382,700 A | 5/1983 | Youngren |

(Continued)

FOREIGN PATENT DOCUMENTS

| EP | 0276335 | 3/1988 |
| EP | 898202 | 2/1999 |

(Continued)

OTHER PUBLICATIONS

Eduardo et al.; (1991); —; J. Appl. Polymer Science; 71: 259-266.
(Continued)

*Primary Examiner* — R. A. Smith
*Assistant Examiner* — Tania Courson
(74) *Attorney, Agent, or Firm* — Browdy and Neimark, PLLC

(57) ABSTRACT

The present invention is generally in the field of measuring and indicating techniques and relates to a time-temperature indicator and methods of manufacturing and use thereof. More specifically, the time-temperature indicator comprises at least one metal layer or metal containing layer, and in direct contact to the metal layer or to the metal containing layer at least one pad member affixed onto a pad carrier layer, wherein the pad member comprises a pad made of an absorbent material and a dopant medium, whereby the dopant medium comprises a liquid medium or a viscous medium or a viscoelastic medium which is doped with a dopant that destroys the metal/metal containing layers such as an acid, a base or a salt or a photolatent acid or a photolatent base.

16 Claims, 1 Drawing Sheet

(56) References Cited

U.S. PATENT DOCUMENTS

Figure 1:
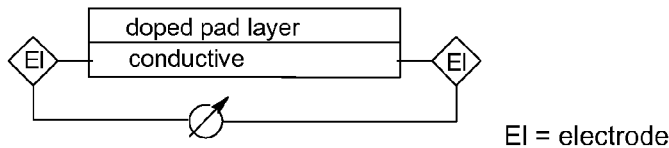

| | | | |
|---|---|---|---|
| 4,432,656 A | 2/1984 | Allmendinger | |
| 4,737,463 A | 4/1988 | Bhattacharjee et al. | |
| 4,773,766 A | 9/1988 | Nagasaka et al. | |
| 4,816,634 A | 3/1989 | Lentz et al. | |
| 4,834,017 A | 5/1989 | Favetto et al. | |
| 4,859,360 A | 8/1989 | Suzuki et al. | |
| 5,053,339 A | 10/1991 | Patel | |
| 5,057,434 A | 10/1991 | Prusik et al. | |
| 5,254,473 A | 10/1993 | Patel et al. | |
| 5,317,987 A | 6/1994 | Mueller et al. | |
| 5,518,824 A * | 5/1996 | Funhoff et al. | 428/690 |
| 5,667,303 A | 9/1997 | Arens et al. | |
| 5,722,317 A | 3/1998 | Ghiron et al. | |
| 5,747,225 A | 5/1998 | Manico et al. | |
| 5,969,606 A | 10/1999 | Reber et al. | |
| 6,009,400 A | 12/1999 | Blackman | |
| 6,042,264 A | 3/2000 | Prusik | |
| 6,242,714 B1 | 6/2001 | Narumiya et al. | |
| 6,382,125 B1 | 5/2002 | Tamura | |
| 6,435,128 B2 | 8/2002 | Qiu | |
| 6,514,462 B1 | 2/2003 | Simons | |
| 6,544,925 B1 | 4/2003 | Prusik et al. | |
| 6,614,728 B2 | 9/2003 | Spevacek | |
| 6,616,332 B1 | 9/2003 | Renken et al. | |
| 6,660,345 B2 | 12/2003 | Coates et al. | |
| 6,865,516 B1 | 3/2005 | Richardson | |
| 6,866,417 B2 | 3/2005 | Gunawardena et al. | |
| 6,974,249 B1 | 12/2005 | Fair et al. | |
| 7,039,927 B2 | 5/2006 | Constantinou et al. | |
| 7,081,364 B1 | 7/2006 | Haarer et al. | |
| 7,213,967 B2 | 5/2007 | Simunovic et al. | |
| 7,232,253 B2 * | 6/2007 | Isbitsky et al. | 368/89 |
| 7,263,501 B2 | 8/2007 | Tirinato et al. | |
| 7,476,874 B2 | 1/2009 | Patel | |
| 8,083,993 B2 * | 12/2011 | Groll | 422/50 |
| 8,267,576 B2 * | 9/2012 | Haarer et al. | 374/102 |
| 8,323,570 B2 * | 12/2012 | Johnson et al. | 422/82.01 |
| 8,343,437 B2 | 1/2013 | Patel | |
| 2002/0056751 A1 | 5/2002 | Lee | |
| 2002/0085164 A1 | 7/2002 | Stanford-Clark | |
| 2003/0139843 A1 | 7/2003 | Hu et al. | |
| 2003/0174263 A1 | 9/2003 | Lawandy | |
| 2003/0193987 A1 | 10/2003 | Zalameda et al. | |
| 2004/0092023 A1 | 5/2004 | Wright | |
| 2004/0182932 A1 | 9/2004 | Kawai | |
| 2004/0240324 A1 * | 12/2004 | Isbitsky et al. | 368/327 |
| 2005/0037498 A1 | 2/2005 | Ribi | |
| 2005/0139686 A1 | 6/2005 | Helmer et al. | |
| 2005/0178841 A1 | 8/2005 | Jones et al. | |
| 2005/0261991 A1 | 11/2005 | Kennamer | |
| 2006/0032427 A1 | 2/2006 | Ishii et al. | |
| 2006/0203882 A1 | 9/2006 | Makela et al. | |
| 2007/0172951 A1 | 7/2007 | Levy | |
| 2008/0129037 A1 | 6/2008 | Roth et al. | |
| 2008/0187021 A1 | 8/2008 | Haarer et al. | |
| 2010/0296545 A1 * | 11/2010 | Haarer et al. | 374/102 |
| 2013/0224875 A1 * | 8/2013 | Haarer et al. | 436/164 |
| 2014/0154808 A1 * | 6/2014 | Patel | 436/1 |

FOREIGN PATENT DOCUMENTS

| | | | |
|---|---|---|---|
| JP | 10046072 A | 2/1998 | |
| JP | 10334171 A | 12/1998 | |
| WO | WO 94/27242 | 11/1994 | |
| WO | WO 99/39197 | 5/1999 | |
| WO | WO 03/044521 | 5/2003 | |
| WO | WO 03/077227 | 9/2003 | |
| WO | WO 2004/077002 | 9/2004 | |
| WO | WO 2005/050192 | 6/2005 | |
| WO | WO 2005/075978 | 8/2005 | |
| WO | WO 2006/048412 | 5/2006 | |
| WO | WO 2006048412 A1 * | 5/2006 | G01K 3/04 |
| WO | WO 2008/083926 | 7/2008 | |
| WO | WO 2008083926 A1 * | 7/2008 | G01K 3/04 |
| WO | WO 2009156285 A1 * | 12/2009 | G01K 3/04 |

OTHER PUBLICATIONS

International Search report for PCT/EP07/064595 dated Apr. 4, 2008.
International Search report for PCT/EP2009/057334 dated Oct. 2, 2009.
International Search report for PCT/IL2004/001070 dated Mar. 4, 2005.
U.S. Appl. No. 61/130,928 to Gordhanbhai N. Patel, filed Jun. 4, 2008; publicly available Dec. 10, 2009.

* cited by examiner

El = electrode

C= O (zero capacitance)

TIME TEMPERATURE INDICATOR

This Application is a national phase of, and claims priority from, PCT Application No. PCT/EP2009/057334, filed on Jun. 15, 2009, which claims priority from European Patent Application No. EP 08158759.4, filed Jun. 23, 2008, all of which are hereby incorporated by reference as if fully set forth herein.

This invention is generally in the field of measuring and indicating techniques and relates to a time-temperature indicator and methods of manufacturing, dispensing and reading this indicator.

Time temperature indicators are devices that are characterized by at least one changeable observable property that progresses in a rate that is proportional to the temperature and time, and thus provide an indication of the full or partial time-temperature history of their immediate surroundings to which they are thermally coupled. Time temperature indicators (TTIs) are simple and inexpensive devices, typically designed as labels. When attached to a perishable good, a TTI (appropriately designed and calibrated) monitors its time-temperature history and provides a simple, usually visual, straightforward summary of the exposure history of the product to time-temperature, thereby providing indication of the product freshness condition. Consequently, TTIs are among the most promising shelf-life-report technologies.

The TTI concept was developed to ensure the safety and quality of perishable goods, such as food and drug products, throughout their entire lifespan, from manufacturing or packaging to the time they are consumed by the end user. The safety and quality of many perishable goods such as food, drugs, vaccines and blood, depend mainly on appropriate storage conditions during distribution and storage. Different factors such as gas composition, relative humidity and temperature affect their real lifetime. The fact that changing conditions affect the effective shelf life of these kinds of goods is not reflected by a "best before . . . " type label that relies on appropriate storage conditions. Of all storage factors, temperature abuse is the most frequently observed factor for pre-dated deterioration, based on diverse physical, chemical, enzymatic or microbial processes. Therefore, the TTI technology can provide a simple tool for controlling the food and drug chain. The color and/or other physical properties of the TTI varies as a function of the time at a rate which is temperature dependent, thus providing an active scale of "freshness" of the product to which it is attached, by comparing the color (or darkness) or any other varying visual property of the TTI label with a given comparative scale. Since the TTI indicators may be designed to provide a distinct "Yes" or "No" type of answer regarding the time temperature factor, they may provide an important "clear cut"-answer and save further elaborate data inspection. This is ideal for HACCP (Hazard Analysis Critical Control Point), where the emphasis is on real time decision making and action.

Various TTIs are disclosed for example in the following patent publications:

U.S. Pat. No. 6,435,128 discloses a time-temperature integrating indicator device that provides a visually observable indication of the cumulative thermal exposure of an object. The device includes a substrate having a diffusely light-reflective porous matrix and a backing. The backing includes on its surface a viscoelastic indicator material for contacting the substrate and a barrier material for substantially inhibiting the lateral and longitudinal flow of viscoelastic indicator material between the substrate and the backing.

U.S. Pat. No. 5,317,987 discloses an indicator for displaying elapsed time (cf. column 5, lines 3, and 35-36) and/or a moment when a change of state occurs, but does not provide any evidence that the indicator is able to display exposition to temperature. The indicator measures the time of the pitting corrosion between a chemical substance and a barrier, said time being merely controlled by suitable selection of the chemical substance and the material of the barrier (cf. column 4, lines 1-7). This is in accordance with Examples 1 and 2 in column 5, lines 49-68, wherefrom it is evident that the chemical substance (polyaluminium chloride or sodium hydroxide) is directly applied to the barrier (aluminium foil), i.e. the chemical substance is not applied in an absorbent material. Claim 11 (which is unsupported by the body of the specification) does not contradict this statement since in view of the dependency of claim 11 on claim 10 the chemical substance is not free, but encapsulated, i.e. unable to react with the barrier.

U.S. Pat. No. 6,042,264 discloses a time-temperature indicator device, designed as a label, for measuring the length of time to which a product has been exposed to a temperature above a pre-determined temperature. The period of time of exposure is integrated with the temperature to which the indicator is exposed. The label is a composite of a plurality of layers adapted to be adhered at its underside to a product container. The label includes a printable surface layer, a longitudinal wicking strip that is adhered underneath the surface layer substantially at the opposite extremities only of the wicking strip and a lower substrate layer forming an envelope with said surface layer. A heat-fusible substance, which melts and flows above a pre-determined temperature, is applied on the surface of the wicking strip contiguous to at least one of the ends of the wicking member. When the heat-fusible substance is exposed to a temperature above the pre-determined temperature, the heat-fusible substance flows along the length of the wicking member. The label has a printable surface layer and is sealed at its peripheral edge to the peripheral edge of the substrate layer. These layers encapsulate the wicking member and the heat-fusible substance. The surface layer is provided with a sight window at an intermediate location over the wicking member through which the progress of flow on the wicking member is observed.

WO 03/077227 discloses a time indicating label comprising a label substrate having first and second surfaces, an acid-based indicator composition, and an activator composition. One of the acid-based indicator composition and the activator composition is on the first surface of the substrate, and both of these compositions when brought in contact remain adhered. The label may have a pressure sensitive adhesive on the second surface of the label. The label provides an effective means for determining the safety of frozen foods. The labels also provide a means of providing security by providing name badges that are time sensitive and may not be reused. The name badges provide a means to monitor the length of a visitor's time and prevent reusing the name badge.

WO 03/044521 discloses a sensor adapted to be remotely readable by RF techniques for identification of the quality of a packaged foodstuff. The sensor either reacts with compounds generated in the atmosphere of the foodstuff package due to the microbiological decay of the foodstuff, for example hydrogen sulfide or other sulfide compounds, or the sensor is responsive to an increased oxygen content in the atmosphere of the package due to a leakage in the package. The sensor is based on a RF circuit. Oxygen or the microbiologically generated gas affects the electrical properties of the circuit material. For example, the resistor, the capacitor or the inductive coil of the circuit or at least a fraction thereof are made of silver, iron, aluminium, a redox-type indicator-dye, a conductive polymer, or copper. Due to the reaction of the aforementioned gases with these materials, the sensor resistance, conductivity, capacitance and/or inductance of the respective sensor elements changes depending on the amount of the disintegrating gas.

WO2006048412 (Freshpoint) describes a time temperature indicator device comprising at least 4 layers, a substrate layer, a salt layer and a metal layer and a polymer layer. The dry salt layer is evaporated atop the substrate layer. The metal is in direct contact with the dry salt layer. The metal layer covers the salt layer entirely to avoid that due to humidity the salt starts to dissolve and affects the metal. Above the metal layer is a layer of a viscoelastic polymer. The viscoelastic polymer has a solid to liquid transition when exposed to temperatures higher than a certain threshold temperature. Being liquid the viscoelastic polymer diffuses through the metal and thus mixes the metal layer and the salt layer. Now the metal layer is etched and changes its thickness and conductivity. The time temperature detection depends on the viscosity of the polymer layer. For different threshold temperatures different polymers are required.

The problem underlying the present invention is to find a TTI which is easily producible and in which the polymer layer can be tuned to different affecting agents, for example etching agents and to different etching rates. In this configuration the TTI can be tailored to different time and temperature regimes by taking different affecting agents and polymers of different viscosity.

PCT Application PCT/EP/2007064595 (filed Dec. 28, 2007) solves the above mentioned problem by providing a time temperature indicator comprising at least one metal layer or metal containing layer and in direct contact to the metal layer or to the metal containing layer at least one doped polymer layer, wherein the dopant is an acid, a base or a salt or a photolatent acid or a photolatent base which dopant is added to the polymer, and/or at least one polymer layer wherein a polymer is functionalized with acidic or latent acidic or basic or latent basic groups; or
a time temperature indicator comprising at least one polymer layer containing metal particles and a photolatent acid or a photolatent base, or at least one polymer layer containing metal particles wherein the polymer is functionalized with latent acidic or latent basic groups.

The doped polymer layer or the functionalized polymer layer in contact with the metal is responsible for the time-temperature dependent changes in the optical, electrical, and/or electronic properties of the TTI and/or one or more of its components.

The doped polymer is, for example, etching, dissolving, fragmenting or decomposing the metal thus causing a change in the optical and/or electrical properties of the metal layer or the metal containing layer.

It has now been found that an improvement may be achieved by using a pad member affixed onto an adhesive layer.

Thus, the present invention relates to a time temperature indicator (TTI) comprising
a) at least one metal layer or metal containing layer, and in direct contact to the metal layer or to the metal containing layer
b) at least one pad member affixed onto a pad carrier layer, wherein the pad member comprises a pad made of an absorbent material and a dopant medium, whereby the dopant medium comprises a liquid medium or a viscous medium or a viscoelastic medium which is doped with a dopant able to destroy the metal/metal containing layers.

The invention relates especially to such a TTI wherein the dopant is neither micro- nor macroencapsulated, but present in a free form (including an unencapsulated photolatent form).

The physical principle underlying the time temperature behaviour of the above TTI is mainly based on a combination of the following two factors, i.e. in simplified terms the speed (rate) of moving the dopant through the absorbent material to the metal layer or to the metal containing layer, and the speed (rate) of the destruction process of the metal layer or metal containing layer, more precisely the diffusion coefficient and/or rate of the dopant through/in the absorbent material, and the rate of the destruction process of the metal layer or metal containing layer.

Definitions:
The Pad Member

The pad member is the carrier or the container for the etchant and is in direct contact with the metal layer when the TTI is in its active mode.

The pad member comprises a pad made of any absorbent material which is able to receive or to host the dopant medium or the etchant. The pad is, for example, made of cellulose, nitrocellulose, filter paper, polyethersulfone (PES), nylon, membranes, cotton, cloth, self-adhesive hydrocolloids and the like.

The dopant medium is a liquid medium or a viscous medium or a viscoelastic medium which is doped with a dopant that destroys the metal/metal containing layes such as an acid, a base or a salt or a photolatent acid or a photolatent base.

In another embodiment, the pad consists of a membrane allowing material transport which is coupled to an absorbent material soaked with the liquid dopant medium. The activation of the system is performed by contacting the metal layer with the membrane.

In another embodiment, the pad consists of a polymeric film containing acidic functionalities such as sulfonic acid and its derivatives (Nafion membranes as a representative example), phosphonic acid and its derivatives, and the like. Mixtures of acid functionalities are also possible. The acid functionalities may be part of the polymeric backbone or bound to the polymer by physical bonds. The polymeric film allows material transport (a membrane being a representative example). A liquid or a viscoelastic medium allows the contact between the acid functionalities and the metal layer.

In another embodiment, the polymeric film bears basic functionalities. The basic functionalities may be part of the polymeric backbone or bound to the polymer by physical bonds. The polymeric film allows material transport (a membrane being a representative example). A liquid or a viscoelastic medium allows the contact between the basic functionalities and the metal layer.

The pad member is affixed onto a pad carrier layer thus forming a pad layer. The pad carrier layer may be, for example, polypropylene (PP) polyethylene (PE) or polyethyleneterephthalate (PET) or an adhesive. In one embodiment the pad substrate layer is an adhesive layer. Optionally a substrate (backing) layer is protecting the adhesive layer.

Adhesives are natural adhesives or synthetic adhesives, for example based on elastomers, thermoplastic, and thermosetting adhesives.

The Dopant

The dopant is a component in the liquid/viscous/viscoelastic medium enabeling the destruction of the metal layer or metal containing layer at a rate that is temperature dependent. The dopant is preferably an etchant.

In one embodiment the dopant is a salt.

The salt is preferably selected from the group consisting of water soluble salts such as sodium chloride, potassium iodide, lithium fluoride, potassium chloride, sodium iodide, lithium fluoride, sodium carbonate and the like. Mixtures of the salts are also possible. Also possible are mixtures of salt or salts with other components such as acids, bases etc.

In another embodiment the dopant is an acid.

The acid is preferably selected from phosphoric acid, nitric acid, hydrochloric acid, sulphuric acid, polyphosphoric acid, pyrophosphoric acid, phosphonic acid, alkyl phosphonic acid (and derivatives), aryl sulfonic acids and alkyl sulfonic acids (and derivatives) and the like. An example of an aryl sulfonic acid may be Dodecyl Benzene Sulfonic Acid (DBSA), Trifluoroacetic acid (TFA). Mixtures of the above acids are also possible.

In yet another embodiment the dopant is a base.

The base is preferably selected from an alkali metal hydroxide, ammonium hydroxide, alkali carbonate, ammonium carbonate, tetra alkyl ammonium hydroxides, tetra alkyl ammonium fluorides and the like. Mixtures thereof are also possible.

In one embodiment the dopant is a photolatent acid where the acid is released upon irradiation with light.

Some photolatent acids are commercially available and are, for a non limiting example, selected, from the group ESACURE (Lamberti), IRGACURE (Ciba) e.g. IRGACURE® PAG103 (2-methyl-α-[2-[[[(n-propyl)sulfonyl]oxy]imino]-3(2H)-thienylidene]-benzeneaceto-nitrile 2(5H)-thienylidene]-benzeneacetonitrile), IRGACURE® PAG108 (2-methyl-α-[2-[[[(n-octyl)sulfonyl]oxy]imino]-3 (2H)-thienylidene]-benzeneacetonitrile), IRGACURE® PAG121 (2-methyl-α-[2-[[[(4-methylphenyl)sulfonyl]oxy] imino]-3(2H)-thienylidene]-benzeneacetonitrile), IRGACURE® PAG203, Ethanone, 1,1'-[1,3-propanediylbis(oxy-4,1-phenylene)]bis-[2,2,2-trifluoro-bis[O-(propylsulfonyl) oxime], UVI (DOW), CYRACURE (DOW), 2-(-Methoxystyryl)-4,6-bis(trichloro-methyl)-1,3,5-triazine (Aldrich), sulfonates photoacid generators (Midori Kagaku).

In one embodiment the dopant is a photolatent base where the base is released upon irradiation with light.

Some photolatent bases are commercially available and are, for a non limiting example, IRGACURE (Ciba) such as for example, IRGACURE® 369 (2-Benzyl-2-(dimethylamino)-1-[4-(4-morpholinyl)phenyl]-1-butanone as described in EP 898202 or IRGACURE® 907 (2-Methyl-1-[4-(methylthio)phenyl]-2-(4-morpholinyl)-1-propanone).

A non limiting example for the photo production of phosphoric acid is presented here as a non-restrictive example of the formation of an acid upon irradiation:

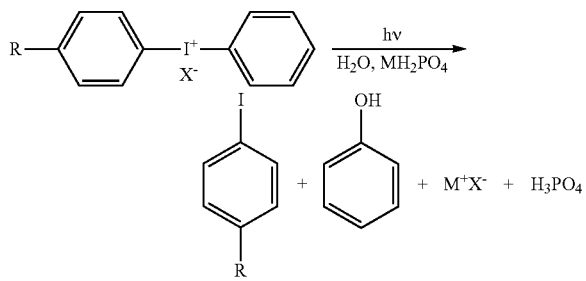

The reaction described above can be performed in the presence of various alcohols, resulting as well in the formation of phosphoric acid.

In some embodiments, it is preferable to use photosensitizers such as ITX for improved spectral sensitivity and quantum yields for the photoprocess.

The Liquid Dopant Medium

Appropriate media for the dissolution of the dopants are selected from the following: water, alcohols, polyvinyl alcohol, polyethylene imine, hydroxyethyl cellulose, carboxymethyl cellulose, and the like. Mixtures thereof are also possible. p The "liquid dopant" is composed of a medium doped with a metal layer or a metal containing layer destroying active ingredient (the dopant) and is added to the pad, thus obtaining a "reactive pad member" which affects the metal due to its salt content or due to its acid or base content. The dopant is, for example, added in a concentration of 1-20%, preferably 1-10%.

The Metal Layer/Metal Containing Layer

The time temperature indicator according to the invention comprises a metal layer or a metal containing layer, optionally incorporated into, or onto a substrate material such as, for example, polyolefin or polyester films or paper. The metalization of the substrate material is performed by known methods such as physical vapour deposition (PVD), chemical vapour deposition (CVD), and the like.

Suitable metals for forming the metal layer are selected from aluminium, copper, silver, iron magnesium, titanium, tin, chromium, zinc, nickel, and alloys of these metals.

Preferred is aluminium.

The thickness of the metal layer is from 1 nm to 1 mm, and preferably from 5 nm to 500 μm.

In one embodiment, the metal layer is a metal containing layer consisting of or based on inks containing metal pigment dispersions.

The wet film weight of the ink layer is from 1 to 50 g/m², preferably from 2 to 30 g/m².

Suitable inks belong, for example, to the vacuum-metallized aluminum pigments of the METASHEEN brand (Ciba), and to METALSTAR, TOPSTAR, ULTRASTAR, ROTOSTAR, PRISMASTAR, PEARLSTAR and MFX brands (Eckart).

In one embodiment the metal layer are metal particles in a polymer matrix.

The metal/metal containing layer may be configured in a step design, e.g. in a stairs design or section design, i.e. the metal/metal containing layer may comprise at least two sections of different thickness. When exposed to the same concentration of dopant, e.g. etchant, each step or section is reacting at a different rate. To achieve this objective, metal layers of different thickness can be placed into different steps or sections of one and the same label. The same effect can be achieved with metal inks by printing inks with different pigment size on different sections of the same label. Alternatively, the steps can be achieved by printing layers of different ink thicknesses. The steps may be in the form of a gradient.

The goal of destructing/dissoluting/disintegrating various sections of the metal layer/metal containing layer at a different rate can also be achieved by other means than different layer or ink thicknesses or different pigment sizes, e.g. by contacting/covering/superimposing said sections with different pad members/dopant media/dopants.

By TTIs constructed in the above manner, it is possible to monitor the freshness conditions of perishable goods continuously and to get more information than just whether the goods are still o.k. or not.

Steeping of the Pad with the Liquid Dopant

There are several methods to prepare the pad member.

In one method, the absorbent material (the pad) is immersed in the liquid dopant medium, allowing a homogeneous absorption of the liquid dopant medium into the pad. Excess liquid dopant is discarded by the application of a supplementary absorbing material on atop the pad.

The pad member is affixed onto a suitable substrate (PP, PE, PET and the like), thus obtaining a first label or an adhesive layer is stucked on the pad member using a sliding bar kept at a pre-defined distance from the pad. A suitable apparatus for such action is the use of a k-lock paint applicator.

In another method, the liquid dopant is spread uniformly at a given thickness atop the pad using a paint spreading apparatus.

In an other method, the liquid dopant is poured on the pad by means of an external aid such as a Pasteur pipette, or by a known printing technique such as slot die and others, or directly by pouring the liquid dopant from a tank when the pad is laid on a grid.

The excess dopant can be removed by applying a second substrate layer forming a new substrate. This new substrate is passed in a slot with predetermined width, thus expelling the excess liquid dopant.

Several different pads can be combined in one label. Each pad can contain different concentrations of the same dopant and/or different dopants and/or dopant media with different viscosities and/or different dopant media. Alternatively, these changes can be applied on one pad in a step-like configuration of with a continuous variation.

The Way to Activate the Time-temperature Count

Each TTI system needs to be activated at a given time. There are two ways to initiate the activation.

In a one label system the metal layer or the metal containing layer is applied onto a substrate and is in direct contact with the pad layer containing the photolatent dopant. Metal layer and pad layer form one label. The activation is done by irradiation with light of the photolatent dopant. For example UV light is used. In one embodiment, the irradiation is performed directly on the pad prior to the application of the adhesive layer. In another embodiment, the irradiation is performed through the adhesive layer.

In a two label system, the metal layer or the metal containing layer is applied onto a substrate and forms one label. The pad layer containing the dopant forms a separate label. The activation is made by contacting the labels.

Preparation

Two Label System

In a further embodiment, the present invention also relates to a method for producing the time temperature indicator as described hereinbefore comprising the steps of a) doping a pad by adding a liquid medium or a viscous medium or a viscoelastic medium which is doped with a salt solution, a liquid acid or a liquid base to the pad thus obtaining a reactive pad member, The solvent in the dopant liquid may be water or any viscous medium suitable for the dissolution of the dopant.

b) applying the reactive pad member of step a) on a carrier thus obtaining a reactive pad layer as one label;

c) applying a metal layer or a metal containing layer on a substrate thus obtaining a second label;

d) activating by applying the pad layer of step b) onto the metal layer of step c).

Step c may be performed by vapour deposition or electrochemical deposition or in any other way. In case the metal containing layer is an ink, the ink is printed onto the substrate.

One Label System

A method for producing the time temperature indicator as described hereinbefore comprising the steps of a) doping a pad by adding a liquid medium or a viscous medium or a viscoelastic medium which is doped with a latent acid or a latent base thus obtaining a reactive pad member, The solvent in the dopant liquid may be water or any viscous medium suitable for the dissolution of the dopant, b) applying the pad member on a metal layer or a metal containing layer affixed on a substrate thus obtaining a label whereby placing one layer atop the other may be done either before activation or after or at the same time.

The substrate for the metal layer is preferably selected from the group consisting of paper, cardboard, paperboard, a plastic material (polypropylene, polyethylene, polyester) or metal.

The TTI manufacturing process can be carried out using processing technologies suitable for packaging machines, preferably using gravure printing, spray coating, inkjet, blade coating, offset, flexo, spincoating, silk screen printing, curtain coating, metering rod (Meyer rod) coating, slot die (extrusion) coating and/or lamination processes. The entire surface of the packaging material may also be coated by said electrical and/or optical temperature detector/indicator, and if necessary, self-adhesive labels may be manufactured therefrom for attaching on the package. Each layer may also be printed on its respective substrate followed by adhesion thereof with each other e.g. for producing self-adhesive labels. An adhesive layer may optionally be placed between the layers.

The dopant liquid may be adsorbed into the pad member by soaking up the pad with the dopant liquid, or by pouring/spreading the dopant onto the pad. Excess dopant liquid may be discarded by outer absorption with an absorbing material, or by passing the labels through a fixed width slot after/before the activation.

The activation of the system (adhesion of two layers for the two labels system and light irradiation for the latent system) may be induced prior to the delivery onto the packaging. The activation may take place after one or more layers are attached to the packaging.

The adhesion of the reactive pad layer to the metal layer may be carried out by using a device for dispensing labels.

One dispenser attaches the label bearing the doped pad layer to the surface of the metal layer while the second dispenser deposits the combined labels (doped pad layer+metal layer) atop the surface of the good to which the TTI indicator is to be attached.

A further embodiment is a method of activating and dispensing the present TTI label comprising two label dispensers where one dispenser attaches the metal containing label atop the surface of the good to which the TTI indicator is to be attached while the second dispenser deposits the layer bearing the doped pad layer to the surface of the said metal containing label.

Another very likely option is using a "double" dispenser that first applies one label on the second, than dispenses both (as a single label) on the packaging material.

A method of activating and dispensing a TTI label comprising a latent reactive pad layer by using a label dispenser that is equipped with a light source for activating the photolatent reactive pad layer.

The time temperature indicator may optionally be coated with a protective layer.

Monitoring the Time Temperature History

The time temperature indication may be achieved electrically or electronically by detecting a time temperature dependent change in the electrical property or properties of the device and/or said metal layer. In the most simple case the electrical property is the resistance.

The time temperature indication may be achieved optically by detecting a change in an optical property (such as for example absorption, transmission, reflectivity) of the device and/or said metal layer itself or optically measuring a prefabricated background of said metal layer which becomes accessible due to the time temperature dependent dissolution, disintegration, reaction, oxidation or any other process inflicted by the reaction of the metal containing layer and pad layer. For instance, a color change of the metal layer, which is preferably a colored electro-oxidized aluminum layer, is determined either visually by comparing to a reference sample, or using an optical color reader, for example, by detecting a change of light power passing through the TTI. This change can also be observed in a reflective mode.

Alternatively, pictograms can be included in/on the pad. These pictograms become visible upon dissolution of the metal layer.

A change in electrical conductivity may be measured electrically using a contact device by bringing two electrodes in contact to the time temperature indicator, or by using RF techniques. Here the time temperature indicator is incorporated as a part into a RF tag or RFID. The RFID containing an above described metal/pad element will change its characteristics upon time and temperature in a well defined fashion.

In one embodiment the metal layer is part of a capacitive device which is characterized by at least two conductive layers i.e. at least two capacitor plates with a doped pad layer acting as the affecting layer and a second thin dielectric/insulating layer between the conductive layers providing high capacitance values.

Here the capacitance of the system changes as a function of the time and temperature by either etching and/or dissolving.

Instead of a capacitive geometry the metal layer may also be patterned to form the features of a RF tag (antenna, resistor or capacitor; RF=radio frequency) which change properties (for instance Q factor) upon the time and temperature dependent etching of a metal layer.

The invention relates especially to TTIs comprising a metal layer consisting of or comprising aluminium which may be divided into at least two sections of different thickness, and/or a pad member consisting of or comprising filter paper as an absorbent material, and/or a dopant comprising aqueous phosphoric acid, and/or an aqueous solution of hydroxyethyl cellulose as the dopant medium.

FIGURES

The invention is further described by the figures which represent non limiting examples.

FIG. 1 is a resistor

It is a schematic illustration of a resistive TTI comprising one metal layer in contact with a doped pad layer. The resistance is measured with two electrodes.

EXAMPLE 1

In the resistor device according to FIG. 1 the electrical conductivity/resistance is recorded in kΩ as a function of time at a temperature of 23° C. The doped pad is MN 615 filter paper (filter for medium to fast filtration—Macherey-Nagel). The dopant medium is a 1% solution of hydroxyethyl cellulose in water. The dopant is 1% phosphoric acid ($H_3PO_4$; 85% in water). The metal layer is a PVD aluminum metalized BOPP (biaxially oriented polypropylene) film (Dor Film, OD=2.2).

Upon dissolution of the conductive aluminium layer a drastic drop in electric potential (conductivity/resistance) is observed.

Figure 2:
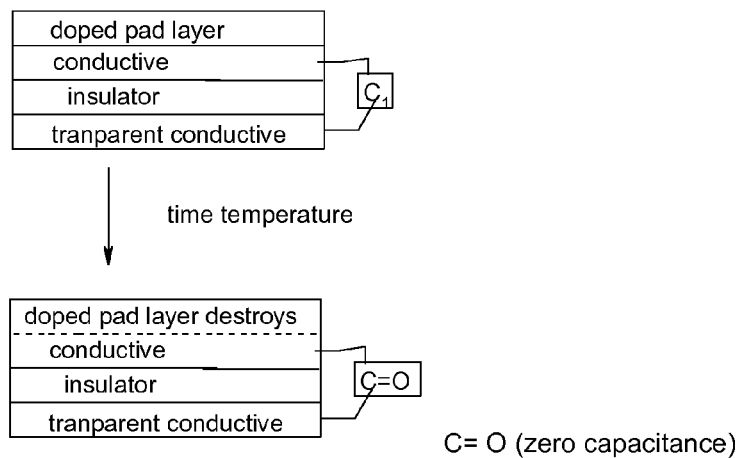

FIG. 2 is a capacitive device.

FIG. 2 is a schematic illustration of a TTI structure according to one embodiment of the invention, utilizing a capacitive device which is characterized by two conductive layers with a dielectric/insulating layer in between.

Layer 1 is a transparent conducting layer allowing the visual/optical observation of the etching process of the conducting layer 3, for example an aluminum layer.

The doped pad layer is the top layer of FIG. 2 (layer 4).

For creating high values of the capacitance (C) the dielectric/insulating layer 2 (Insulator) is in our example a thin polymer layer (typically polyimide) with a layer thickness of typically 10 to several 100 nanometers (layer two from the bottom). The aluminium layer is destroyed by etching. The system is both eye and machine readable.

Figure 3A:
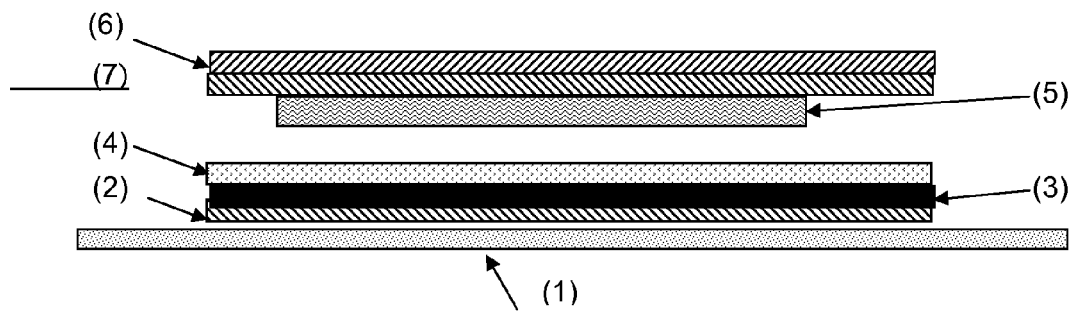
Figure 3:
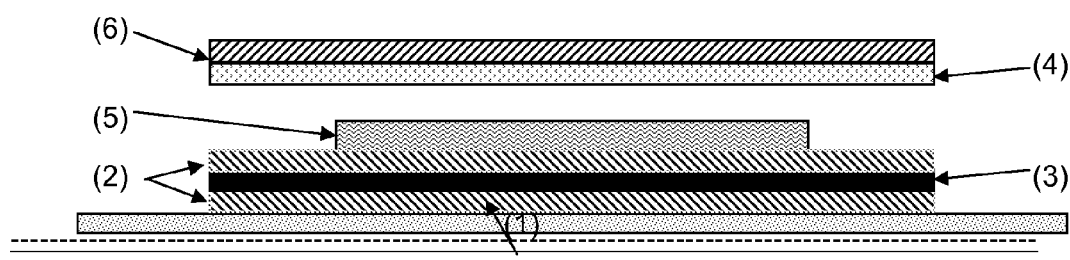

FIGS. 3A and 3B show optical systems.

FIG. 3A is a schematic illustration of a TTI structure according to the invention that focuses on the optical properties of the device, looking at the TTI through the doped pad layer/metal (preferably Al) interface (doped pad layer on top). In this structure the pad layer should be transparent or semitransparent. Such a suitable pad is a self-adhesive hydrocolloid pad.

The metal containing layer of the device is placed atop the substrate such as e.g. the package of a perishable good (1). The metal containing layer is composed of a metal layer, preferably an aluminium layer (4), a metal carrier layer such as e.g. a polypropylene (PP) film, polyethylene (PE) film or paper (3) that is equipped with an adhesive on one side (2).

The reactive label is placed over the metal containing layer and is composed of a doped pad member (5) and a carrier layer (6) equipped with an adhesive layer such as a Pressure sensitive adhesive (PSA, self adhesive) layer (7) thus forming the doped pad layer. FIG. 3A shows the device shortly before the reactive label is laminated to the metal containing part.

The aluminum layer may be produced by one of any known techniques, including vapour deposition, electrodeposition, chemical deposition, electroless deposition and even deposited as printed ink (not necessarily conductive). Alternatively, the aluminum layer may be part of the packaging material itself. This aluminum layer, as it is described, is practically time-temperature stable.

The time temperature count of the TTI starts upon contacting the aluminium layer with the reactive label. The doped pad layer reacts with the aluminum layer (either chemically or physically) at a rate which is temperature dependent. Different signs may be placed behind the aluminum layer in a way that it is exposed once the aluminum layer is consumed.

FIG. 3B is also a schematic illustration of a TTI structure according to the invention that focuses on the optical properties of the device, in this embodiment however looking at the TTI through the metal (preferably Al) layer (metal top).

The upper label is the aluminum layer (4) and its carrier such as PP or PE (6). The time temperature count of the TTI starts upon contacting the aluminium layer with a reactive label consisting of a carrier layer such as PP film, PE film or paper (3) that is equipped with an adhesive on both sides (2) and a doped pad member (5) that reacts with the aluminum layer. The carrier is placed atop a substrate, such as the package of a perishable good (1).

FIG. 3B shows the device shortly before the reactive label is laminated to the metal containing part.

The pad used in both examples is selected from the following materials: cellulose, nitrocellulose, filter paper, polyethersulfone (PES), nylon, membranes, cotton, cloth and the like.

EXAMPLE 2

A TTI setup is used according to FIG. 3A, where the metal layer consists of PVD aluminum (Dor Film, OD=2.2) the carrier is BOPP60 microns.

The doped pad is MN 615 filter paper (filter for medium to fast filtration; Macherey-Nagel). The dopant medium is a 1% solution of hydroxyethyl cellulose in water. The dopant is 1% $H_3PO_4$ (85% in water). The metal layer is a PVD aluminum metalized BOPP film (Dor Film, optical density [OD]=2.2).

The light transmission was recorded in arbitrary units (pWatt) as a function of time and at a temperature of 2, 7, 15, 40° C. The results are shown in Table 1 and show a strong time and temperature dependence.

TABLE 1

| 40 C. | | 15 C. | | 7 C. | | 2 C. | |
|---|---|---|---|---|---|---|---|
| time (min) | µW | time (min) | µW | time (min) | µW | time (min) | µW |
| 0 | 22 | 0 | 21 | 0 | 22 | 0 | 21 |
| 19 | 40 | 48 | 25 | 42 | 24 | 160 | 25 |
| 52 | 270 | 74 | 32 | 192 | 55 | 331 | 36 |
| 74 | 432 | 122 | 63 | 279 | 109 | 1343 | 212 |
| 88 | 515 | 150 | 94 | 304 | 134 | | |
| 98 | 566 | 211 | 190 | 365 | 205 | | |
| 103 | 588 | 265 | 281 | 389 | 234 | | |
| 114 | 626 | 277 | 302 | | | | |
| 132 | 671 | 300 | 342 | | | | |
| 153 | 702 | 323 | 381 | | | | |
| 177 | 719 | 350 | 424 | | | | |
| 239 | 734 | 385 | 478 | | | | |
| 291 | 730 | 410 | 510 | | | | |

Table 2 refers to a TTI setup according to FIG. 3A with variations in the amount of acid. This table displays the influence of the concentration of etchant/dopant as a function of time.

TABLE 2

| 1% acid | | 3% acid | | 5% acid | |
|---|---|---|---|---|---|
| time (min) | µW | time (min) | µW | time (min) | µW |
| 0 | 23 | 0 | 23 | 0 | 22 |
| 34 | 40 | 19 | 34 | 18 | 49 |
| 45 | 56 | 29 | 63 | 35 | 281 |
| 105 | 268 | 47 | 192 | 43 | 519 |
| 1066 | 741 | 55 | 283 | 48 | 630 |
| | | 60 | 346 | 54 | 676 |
| | | 66 | 452 | 68 | 716 |
| | | 73 | 557 | 74 | 730 |
| | | 80 | 646 | 85 | 748 |
| | | 93 | 714 | 97 | 759 |
| | | 109 | 735 | 109 | 775 |
| | | 134 | 749 | 122 | 778 |

The invention claimed is:

1. A time temperature indicator, comprising:
   a) a metal layer or metal containing layer; and
   b) in direct contact with the metal layer or the metal containing layer, at least one pad member affixed onto a pad carrier layer,
   wherein the pad member comprises a pad made of an absorbent material and a dopant medium, wherein the dopant medium comprises a liquid medium or a viscous medium or a viscoelastic medium, which liquid/viscous/viscoelastic medium includes as a component a dopant able to destroy the metal/metal containing layers, wherein, when said metal layer is part of a capacitive device with two capacitor plates and a dielectric/insulating layer therebetween, the pad member is not part of the dielectric/insulating layer between the conductive layers of the capacitive device.

2. A time temperature indicator according to claim 1, wherein the dopant is a salt.

3. A time temperature indicator according to claim 1, wherein the dopant is an acid.

4. A time temperature indicator according to claim 1, wherein the dopant is a base.

5. A time temperature indicator according to claim 1, wherein the dopant is a photolatent acid where the acid is released upon irradiation with light.

6. A time temperature indicator according to claim 1, wherein the dopant is a photolatent base where the base is released upon irradiation with light.

7. A time temperature indicator according to claim 1, wherein the dopant is present in the medium in a concentration of 1-20%.

8. The time temperature indicator according to claim 7, wherein the metal layer is a metal-containing layer consisting of or based on inks based on metal pigment dispersions.

9. The time temperature indicator according to claim 7, wherein the metal layer is a polymer matrix containing metal particles.

10. The time temperature indicator according to claim 7, wherein the metal/metal containing layer comprises at least two sections of different thickness.

11. The time temperature indicator according to claim 7, wherein the metal layer is part of a resistor device.

12. The time temperature indicator according to claim 7, wherein the metal layer is part of a capacitive device comprising two conductive layers with a dielectric/insulating layer therebetween.

13. A method for producing the time temperature indicator as described in claim 1, comprising:
   a) doping a pad by adding to the pad a liquid medium or a viscous medium or a viscoelastic medium which is doped with a salt solution, a liquid acid or a liquid base, thus obtaining a reactive pad member;
   b) applying the reactive pad member of step a) on a carrier, thus obtaining a reactive pad layer as one label;
   c) applying a metal layer or a metal containing layer on a substrate, thus obtaining a second label; and
   d) activating by applying the pad layer of step b) onto the metal layer of step c).

14. A method according to claim 13, wherein said steps a) and b) comprise:
   i) submerging the pad in the liquid dopant or pouring the dopant upon the pad;
   ii) sticking the pad member on a suitable carrier thus obtaining a first label; and
   iii) removing the excess dopant.

15. A method for producing the time temperature indicator as described in claim 1, comprising:
   a) doping a pad by adding to the pad a liquid medium or a viscous medium or a viscoelastic medium which is doped with a photolatent acid or a photolatent base, thus obtaining a reactive pad member;

b) activating the photolatent reactive pad member by irradiation with light, thus obtaining a reactive pad member; and c) applying the pad member onto a metal layer or a metal containing layer affixed on a substrate, thus obtaining a label, whereby placing one layer atop the other may be done either before activation or after or at the same time.

16. In a method of monitoring storage temperatures of product packages and for detecting exceeded temperature limits using a time temperature indicator, the improvement wherein said time temperature indicator is the time temperature indicator of claim 1.

\* \* \* \* \*